(12) United States Patent
de Nie

(10) Patent No.: US 8,659,280 B2
(45) Date of Patent: Feb. 25, 2014

(54) CIRCUIT FOR A SWITCH MODE POWER SUPPLY HAVING A TRANSIENT DETECTION PORTION

(75) Inventor: Robert Henri de Nie, Culemborg (NL)

(73) Assignee: NXP B.V., Eindhoven (NL)

( * ) Notice: Subject to any disclaimer, the term of this patent is extended or adjusted under 35 U.S.C. 154(b) by 163 days.

(21) Appl. No.: 12/968,059

(22) Filed: Dec. 14, 2010

(65) Prior Publication Data

US 2011/0316495 A1    Dec. 29, 2011

(30) Foreign Application Priority Data

Dec. 15, 2009    (EP) .................................... 09179269

(51) Int. Cl.
*H02M 3/156*    (2006.01)

(52) U.S. Cl.
CPC .................................... *H02M 3/156* (2013.01)
USPC ........................................................ 323/285

(58) Field of Classification Search
CPC .............................. H02M 3/156; H02M 3/157
USPC ........... 323/282–285, 351, 234, 286; 361/111
See application file for complete search history.

(56) References Cited

U.S. PATENT DOCUMENTS

| | | | | |
|---|---|---|---|---|
| 6,064,187 A * | 5/2000 | Redl et al. | ...................... | 323/285 |
| 6,424,130 B1 * | 7/2002 | Fukui | .......................... | 323/282 |
| 6,885,175 B2 * | 4/2005 | Mihalka | ...................... | 323/282 |
| 6,894,470 B2 * | 5/2005 | Umemoto et al. | ............ | 323/281 |
| 6,984,966 B2 * | 1/2006 | Kubota et al. | ................. | 323/282 |
| 7,599,197 B2 * | 10/2009 | Ishii et al. | ....................... | 363/15 |
| 7,952,337 B2 * | 5/2011 | Gurcan | ........................ | 323/282 |
| 2005/0189933 A1 | 9/2005 | Brown | | |
| 2007/0085521 A1 | 4/2007 | Nagai | | |
| 2009/0146630 A1 | 6/2009 | Naka | | |
| 2011/0115456 A1 * | 5/2011 | Tanifuji et al. | ................ | 323/283 |
| 2011/0236027 A1 * | 9/2011 | Nosaka et al. | ................ | 323/311 |

FOREIGN PATENT DOCUMENTS

WO             03/050637 A2    6/2003
WO    WO 2010067644 A1 *    6/2010

OTHER PUBLICATIONS

Extended European Search Report for European Patent Appln. No. 09179269.7 (Jul. 13, 2010).
Zhenyu Zhao and A. Prodic, "Continuous-Time Digital Controller for High-Frequency DC-DC Converters," IEEE Trans. Power Electron., vol. 23, No. 2, pp. 564-573, Mar. 2008.
A. Radic, Z. Lukic, A. Prodic, R. de Nie, "Minimum Deviation Digital Controller IC for Single and Two Phase DC-DC Switch-Mode Power Supplies", APEC, 2010 25th Annual IEEE, pp. 1-6, Feb. 2010.

* cited by examiner

*Primary Examiner* — Gary L Laxton
*Assistant Examiner* — Alex Torres-Rivera

(57) ABSTRACT

A circuit for a switch mode power supply is presented. The circuit comprises a transient detection portion adapted to delay an analogue error signal (Vdiff) derived from the output voltage (Vout) of the switch mode power supply and to detect whether the difference between the output voltage and the delayed analogue error signal (Vdel) is within a predetermined range.

7 Claims, 9 Drawing Sheets

CIRCUIT FOR A SWITCH MODE POWER SUPPLY HAVING A TRANSIENT DETECTION PORTION

This application claims the priority under 35 U.S.C. §119 of European patent application no. 09179269.7, filed on Dec. 15, 2009, the contents of which are incorporated by reference herein.

This invention relates to switch-mode power supplies (SMPS), and more particularly to a circuit for a SMPS.

BACKGROUND OF THE INVENTION

Switch-mode power supplies (SMPS) used in consumer electronics, portable applications, and computers, are required to meet stringent voltage regulation requirements using a cost-effective implementation occupying a small volume. The regulation is usually achieved with on-chip integrated controllers which typically utilize voltage mode pulse-width modulation (PWM).

When a load change occurs, it is the task of the supply regulator to keep the supply voltage within a well-defined range in order to prevent overstress or performance degradation.

A fast reaction to such load changes is required to prevent too much deviation from the nominal supply-value. The traditional voltage mode PID control is not very suited for this, whether it is implemented in an analogue or digital way, mainly because the regulation parameter, usually the duty-cycle of the PWM control signal, is only updated once in a switching cycle. Thus, even with large gain-settings, it can take up to a switching period before a reaction is due.

A fast load change, in either direction, is often referred to as "transient". Methods to recover quickly from such transients, called "transient improvement", typically aim both to minimize the over- or under-shoot as well as to shorten the recovery time. Recovery time is defined as the time needed from the start of the transient to the point where the output voltage is back within the required steady-state regulation band.

Many methods of transient improvement have been proposed, such as Active Transient Response by Primarion and Non Linear Response by Zilker, These have recently gained acceptance due to the availability, and commercially affordability, of digital techniques.

Such methods try to react as soon as possible to a load transient and act accordingly.

Usually, an error signal is obtained and processed for analysis before the decision is made a real transient occurred. During this processing, however, valuable time is wasted, leading to an already large deviation of the output voltage from its reference value. The sooner corrective action can be taken, i.e. starting to transfer maximum possible energy to the output in the case of a light-to-heavy load change, or, stopping immediately any energy transfer in the case of a heavy-to-light load change, the smaller the resulting under- or over-shoot, respectively, will be.

Thus, for a good transient response, it is important to have a transient detection as fast as possible, whilst also being reliable and distinctive.

When corrective action has been taken (either maximum energy transfer or none at all), the output voltage ($V_{out}$) will eventually reach its maximum deviation (called the valley or peak, respectively). For many improvement methods, it is important to precisely determine the moment the valley or peak occurs. In other words, it is desired to accurately determine the moment when $dV_{out}/dt=0$. Any substantial deviation or error in such detection will render the response non-ideal.

It should be noted here that such a peak or valley occurs in a buck convertor (a SMPS which is a step-down DC to DC converter) on the moment when the current through the inductor becomes equal to the load current drawn from the convertor output.

A complication here is the fact that the measured $V_{out}$ is not the real voltage on the intrinsic output capacitor $C_{out}$, due to the parasitic series resistance ESR ($R_{esr}$) of the capacitor. It can be easily derived the voltage on the intrinsic capacitor will lag by a time $t_{esr}=R_{esr} \times C_{out}$, for which a correction can be made when determining the peak/valley by observing $V_{out}$.

Shortly after a load change occurs, a second change may occur, in the same or opposite direction. This is commonly referred to as "multi load step". Many methods of transient improvement lack the possibility to detect such consecutive transients, while still handling the first one, possibly leading to unwanted large output voltage excursions.

Among the most commonly used solutions in digital implementations for obtaining the error signal, being the difference between the voltage set-point $V_{ref}$ and the output voltage $V_{out}$, the following methods are known:

1) A low resolution Flash ADC, converting only the deviation of $V_{out}$. This is small and efficient, but suffers from a limited semi-fixed conversion range (which only changes when the set-point $V_{ref}$ changes).

2) A very fast high-resolution ADC, covering the total $V_{out}$ range. This has the drawback of requiring a large silicon area and is power hungry.

3) A so-called Track-and-Detect ADC which is small and effective in transient detection, but still requires error tracking in order to determine the peak or valley.

The most common way of digitising the error signal is by using a differential amplifier followed by a fast Flash ADC, as depicted in FIG. 1.

The differential amplifier 10 produces the differential voltage of the two terminals $V_{out\_p}$ and $V_{out\_n}$, between which the generated output voltage $V_{out}$ is regulated. $V_{out}$ is connected to all positive inputs 'in' of first to Nth comparators 12. The reference inputs 'ref' of the comparators 12 each have a different reference level, both positive and negative, and not necessarily equidistant, with respect to the reference voltage Vref, in essence the set-point. For each comparator whose input 'in' sees a higher voltage than its reference input 'ref', the output will be high. Thus, the generated output of the Flash ADC will behave like a thermometer code, which may be subsequently encoded into a form of error code.

The number N of comparators 12, in combination with the reference levels, determines the accuracy and the useful range of the error measurement. For an accurate peak-/valley-detection a small difference between the reference levels is preferred. If the peak or valley always occurs in the same region, this solution may be adequate, but this is not usually the case and thus a large number of comparators is generally needed, making this known solution unsuitable for many applications.

Another way of addressing the accuracy issue is to apply a full-fledged, fast, high-resolution ADC (as shown in FIG. 2), to digitise the absolute value of $V_{out}$ with the required number of bits. Such an ADC, however, usually consumes a large amount of current and occupies a relatively large area in silicon. Moreover, a transient can only be detected by processing the error signal, unless two extra comparators are added to perform this function, but with the same multi load step detection problem as in the previous solution.

A third option is the so-called Track-and-Detect ADC, as depicted in FIG. 3.

Here, two (static) comparators 30 are used for steady-state regulation and two other (dynamic) comparators 32 are used for transient- and peak-/valley-detection, thus requiring only a very small silicon area. However, this approach lacks the possibility to detect a transient faster than via error processing. It will be appreciated that this can be solved by adding two dynamic comparators, with their reference levels forming a somewhat larger window than the peak/valley detection window, to retain the transient detection at all times. Nonetheless, the peak-/valley-detection accuracy depends on the achievable detection window of the two dynamic comparators 32.

A smaller "virtual" window can be obtained by first amplifying the error signal (Vout−Vref), by means of a differential amplifier 34 (having a gain=1+R/R=2 in the arrangement of FIG. 3), before feeding the output (Vdiff) of the differential amplifier 34 to the dynamic comparator 32 inputs 'in'. Here, a simple (analogue) way of filtering spikes and noise is provided by using a feedback capacitor 36.

Whenever Vdiff hits either side of the peak/valley detection window, defined by the reference levels of dynamic comparators 32, the logic gate 38 will close switch 40 until the voltage on hold capacitor 42 is within the detection window again, and so on and so forth, making the voltage on hold capacitor 42 effectively follow Vdiff. Thus, a peak or valley can always be detected by observing a change in the sign of the error signal, derived from the dynamic comparator 32 outputs.

As mentioned above, although the arrangement of FIG. 3 is effective in transient detection, it still requires error tracking in order to determine a peak or valley.

SUMMARY OF THE INVENTION

According to the invention, there is provided a circuit for a switch mode power supply comprising a transient detection portion adapted to delay an analogue error signal derived from the output voltage of the switch mode power supply and to detect whether the difference between the output voltage and the delayed analogue error signal is within a predetermined range.

Thus, there is provided an approach to undertaking fast transient detection and accurate peak/valley-detection. Embodiments may be accurate to whatever level the output voltage excursion may reach (within a normal operating range). They may also be capable of detecting another load change whilst an initial change has not yet been fully counteracted.

The transient detection portion may comprise a resistor-capacitor, RC, combination. An RC combination can have a fairly stable RC product, which can be made easily adaptive in silicon.

The transient detection portion may be adapted to determine if the delayed analogue error signal is smaller or larger than the analogue error signal. A simple voltage comparison may thus be sufficient to accurately determine the location of a real peak or valley.

Embodiments may employ the use of an analogue delay line and three comparators, therefore providing a simple solution having reduced power and area requirements.

According to another aspect of the invention, there is provided a method for regulating the output voltage of a switch mode power supply comprising the steps of: deriving an analogue error signal from the output voltage of the switch mode power supply; delaying the analogue error signal; and detecting whether the difference between the output voltage and the delayed analogue error signal is within a predetermined range.

Embodiments may be used in loop regulators for Point of Load applications or in other applications where a need exists for fast transient detection and/or accurate peak-/valley-detection.

BRIEF DESCRIPTION OF THE DRAWINGS

Examples of the invention will now be described with reference to the accompanying drawings, in which.

DETAILED DESCRIPTION OF EMBODIMENTS

The drawings are not to scale, and some dimensions may have been exaggerated (for example the thickness dimension) to make the drawings show the different components more clearly.

Figure 1:
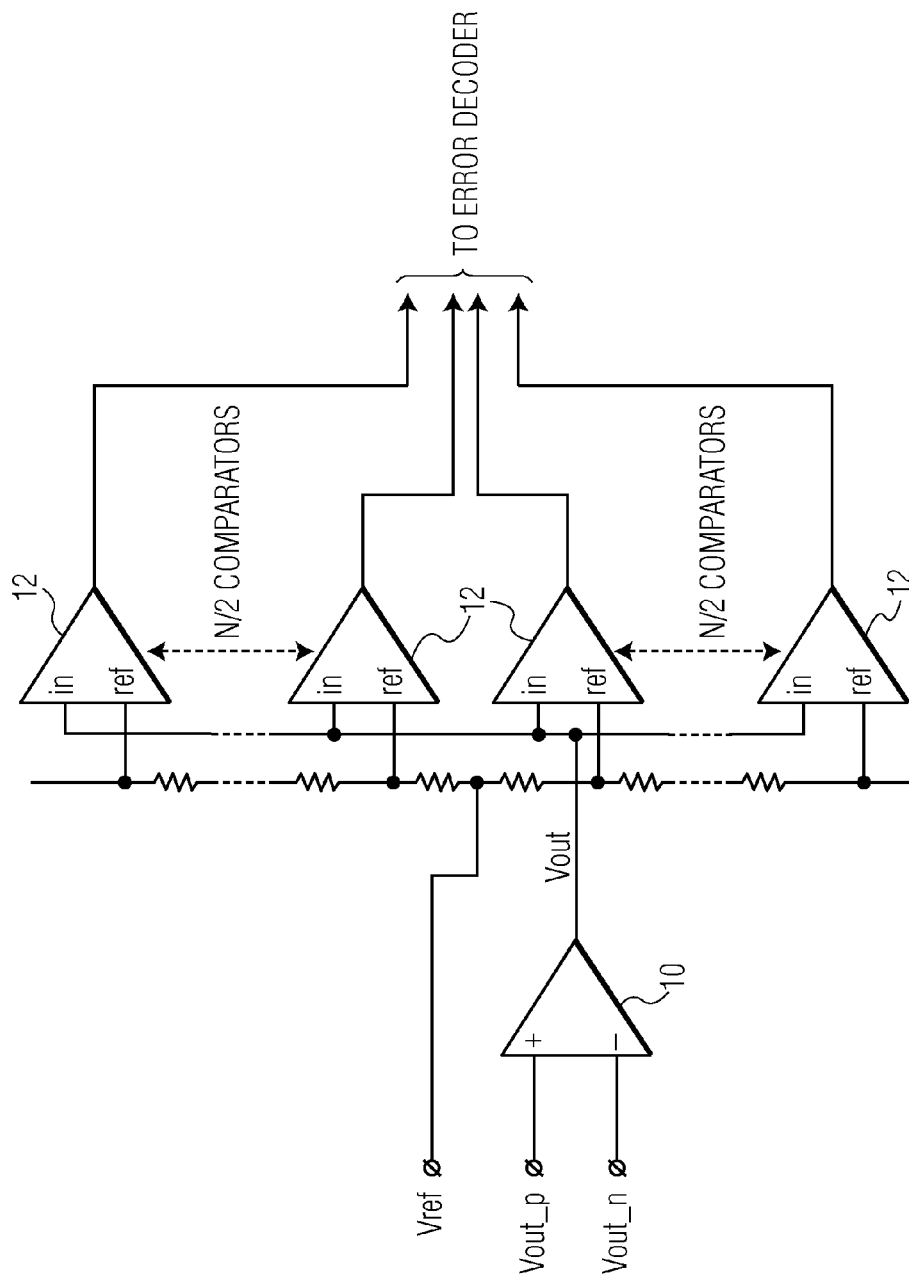
FIG. 1 illustrates a known Flash ADC arrangement for digitising an error signal.
Figure 2:
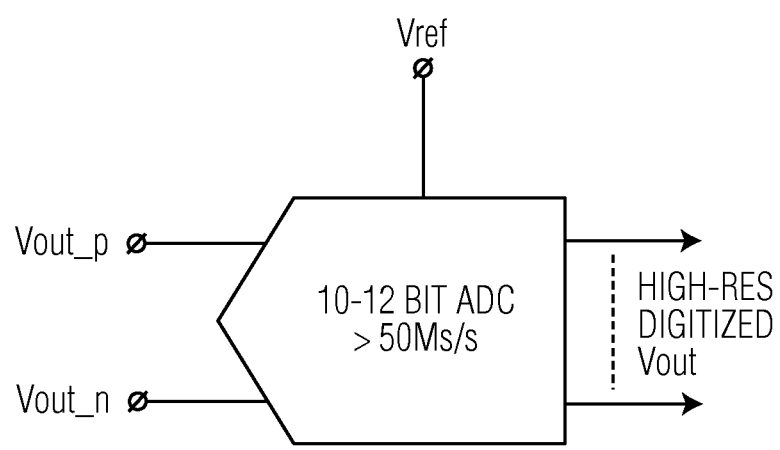
FIG. 2 shows a conventional high-resolution ADC.
Figure 3:
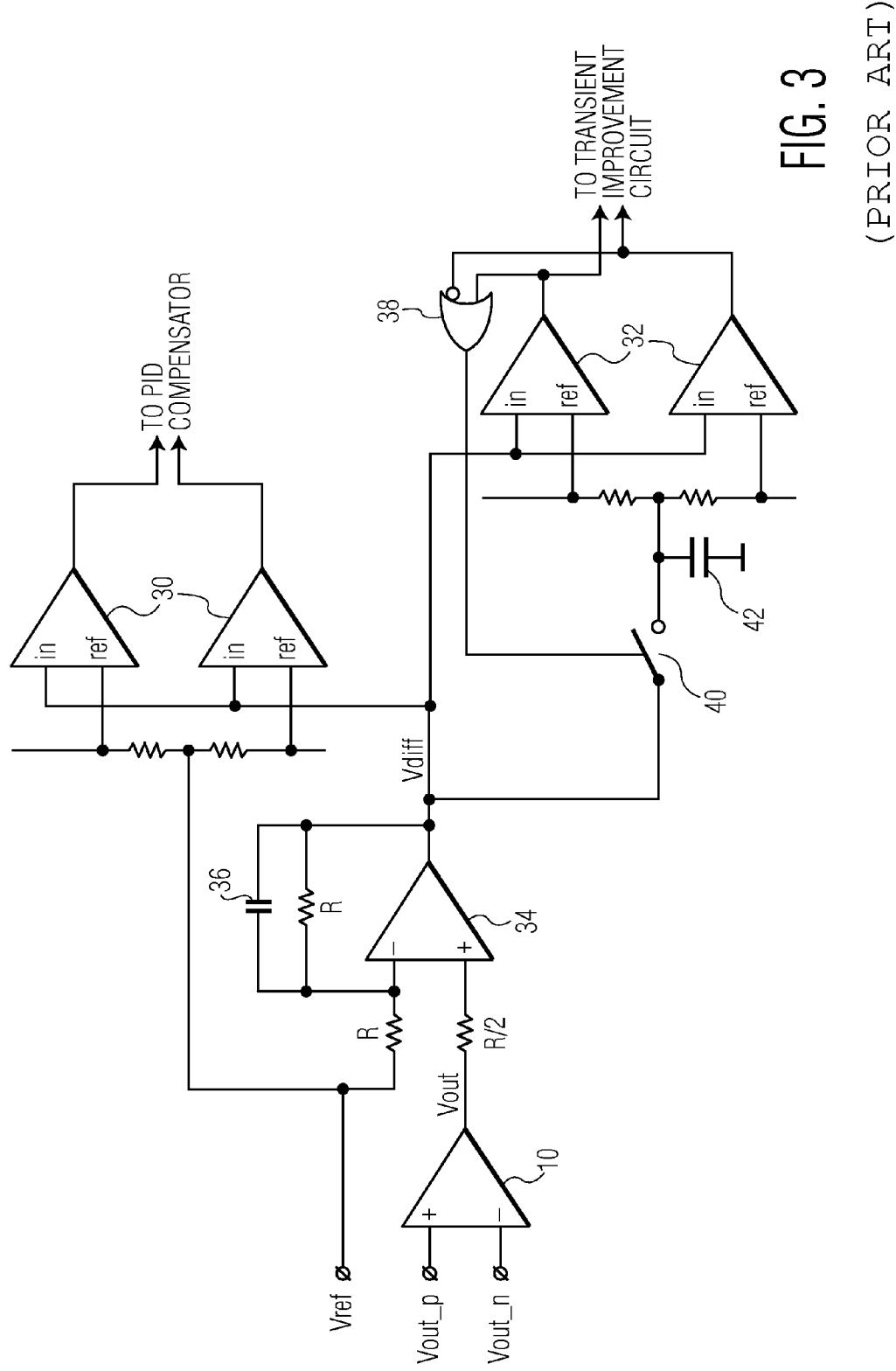
FIG. 3 illustrates a conventional arrangement referred to as a Track-and-Detect ADC.
Figure 4:
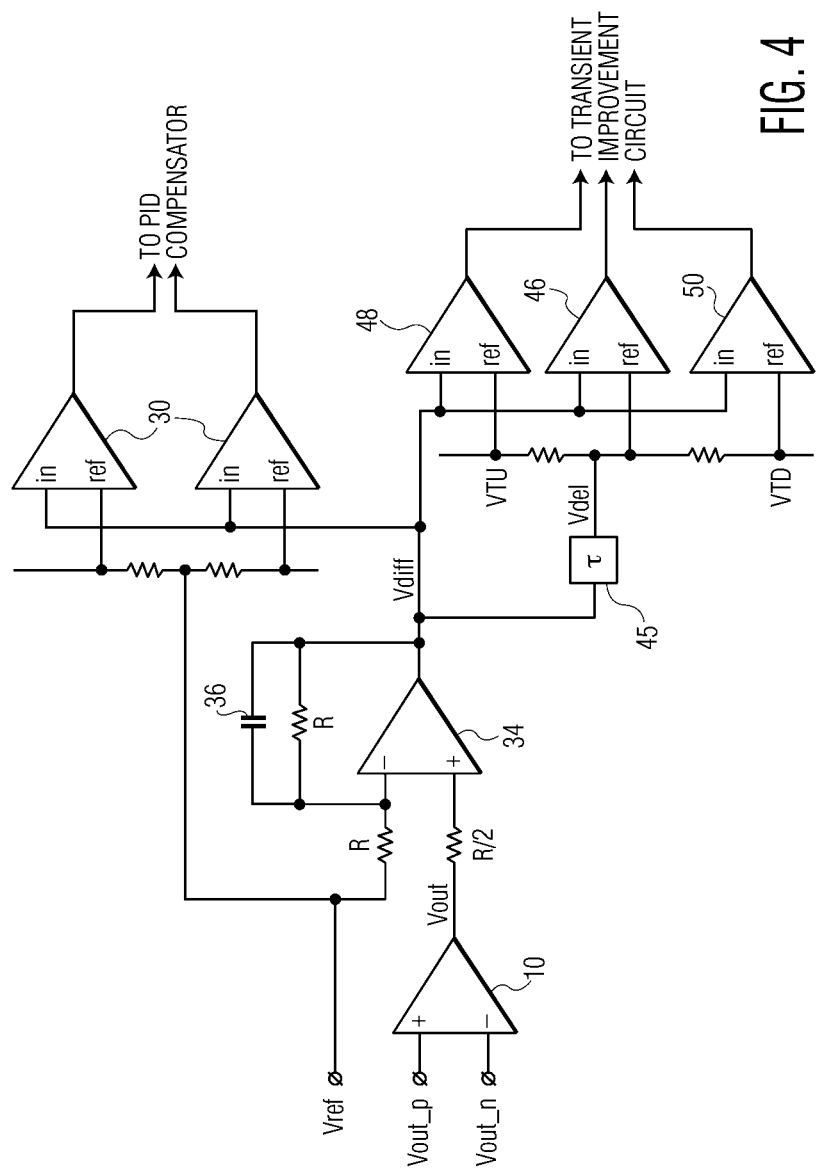
FIG. 4 shows an integrated circuit arrangement according to an embodiment of the invention.

Referring to FIG. 4, it can be seen that the illustrated embodiment is similar to the known circuit of FIG. 3 except that the comparator arrangement used for transient- and peak-/valley-detection is different. Specifically, the illustrated embodiment comprises an analogue delay line 45 and three fast comparators 46, 48 and 50.

Similarly to the known arrangement of FIG. 3, the embodiment obtains the analogue error signal Vdiff (=Vout−Vref) using a differential amplifier 34, whose inverting input is connected to Vref and its non-inverting input to Vout.

A (small) feedback capacitor 36 is connected between the output of amplifier 34 and its inverting input to provide filtering of excessive noise and spikes.

The (amplified) analogue error signal Vdiff provided by the output of the differential amplifier 34 is connected both to steady-state comparators 30 used for the integrator and differentiator with proportional gain (PID) compensator, as well as to the three fast comparators 46, 48 and 50 for the transient- and peak-/valley-detection circuit. The gain factor of the amplifier 34 can be chosen such that a requirement for offset voltage of the comparators can be met easily.

The reference inputs of the steady-state comparators 30 are connected to fixed levels with respect to Vref, while the reference inputs 'VTU' and 'VTD' of the fast comparators 48 and 50 in the detection circuit are connected to fixed levels with respect to a dynamic reference 'Vdel'. The level of this dynamic reference 'Vdel' is solely determined by the output of an analogue delay line 45, having the original analogue error signal Vdiff as its input.

If a load transient occurs and the excursion of Vdiff crosses either side of the transient detection window, formed by the reference levels 'VTU' and 'VTD', and the level crossing occurs within the propagation delay time of the delay line, the transient will be detected and indicated by a state change of one of the dynamic comparators 48 and 50. In this way, the detection circuit detects whether the output voltage is within a predetermined range of the delayed analogue error signal Vdel, wherein the range is set by the reference levels 'VTU' and 'VTD'. In other words, it is detected whether the absolute difference between the output voltage and the delayed analogue error signal Vdel is less than a predetermined threshold value.

The larger the gradient/differential di/dt of the transient, the sooner it will be detected and the better it can be compensated, whereas slow or shallow transients will not trigger the comparators 48 and 50. However, such transients can be compensated adequately by the PID compensator alone.

It will be understood that a small propagation delay of the error amplifier 34 and comparators 48 and 50 will significantly contribute to the achievable transient detection delay and, hence, to the achievable under- or over-shoot.

Accurate detection of a peak or valley is achieved by observing the fast comparator 46 output.

Figure 5:
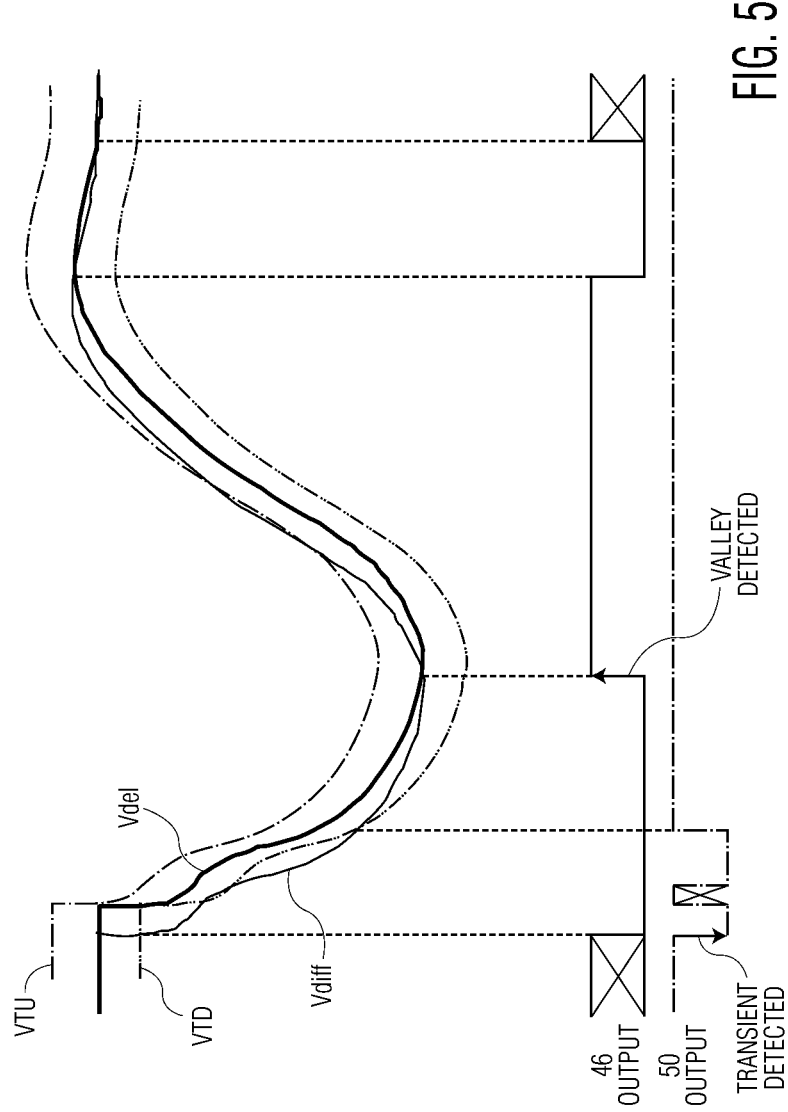
FIG. 5 shows typical waveforms of signals of the embodiment of FIG. 4.

FIG. 5 shows typical waveforms of both the error amplifier output Vdiff and the delay line output Vdel (as solid lines), along with the transient detection levels 'VTU' and 'VTD' (as dash-dotted lines).

At the bottom of the figure the output levels of comparator 46 and the lower comparator 50 are also illustrated.

It has been found that a peak or valley is always very close to the crossing point of the error signal Vdiff with its delayed version Vdel, which can be easily detected via the comparator 46 output state. The requirement for a unity gain of the delay line 45 will be apparent, as otherwise the crossing point of Vdiff and Vdel will move away from the optimal point. It will also be appreciated that the propagation delay of the delay line itself may influence the position of the crossing point and so detection may be less accurate for faster curves where the propagation delay of the delay line is significant.

When considering a practical implementation of the analogue delay line, a simple approach may use a resistor-capacitor (RC) combination. However, an RC-delay does not exhibit unity gain across a range of frequencies, nor an adequate group delay. However, an RC combination can have a fairly stable RC product, which can even be made easily adaptive in silicon.

Figure 6:
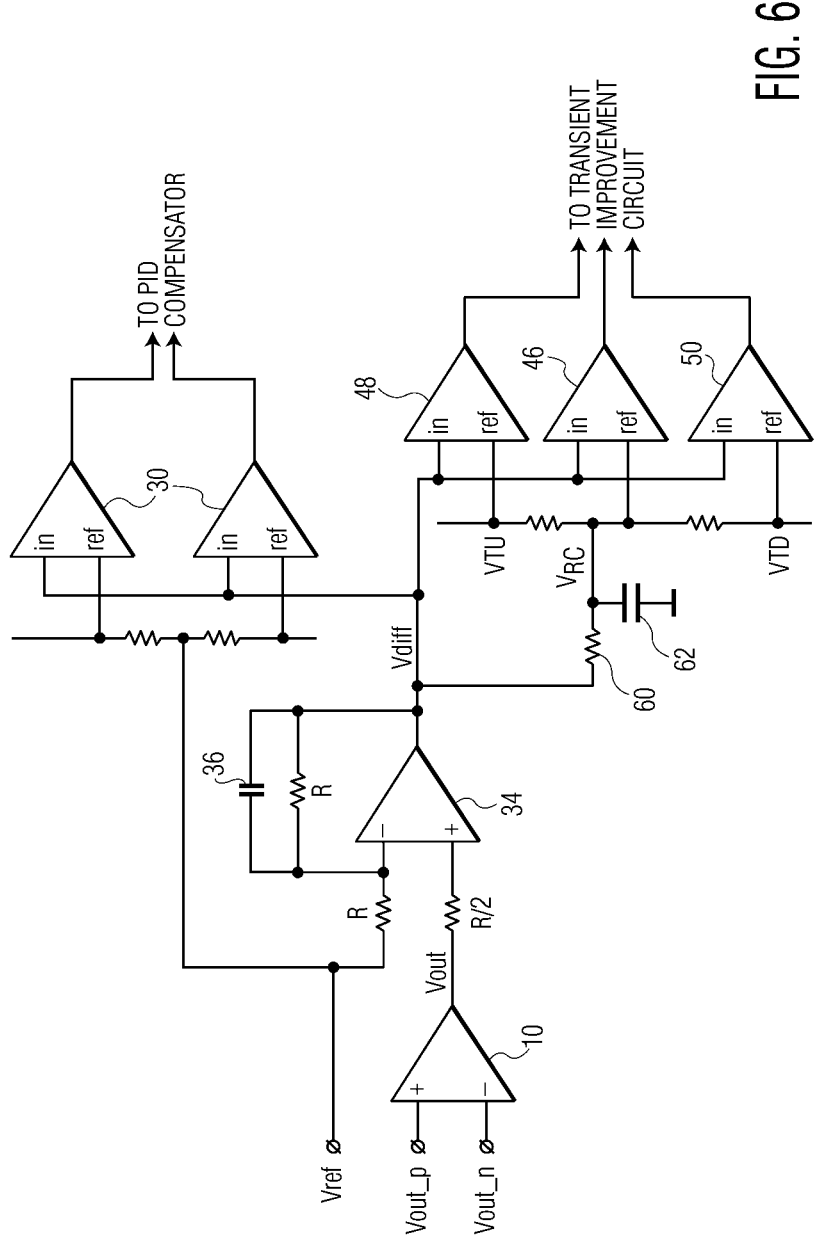
FIG. 6 shows an integrated circuit arrangement according to another embodiment of the invention.

In spite of the abovementioned drawbacks, an RC-delay has an advantage which helps to demonstrate the simplicity of embodiments according to the invention. To demonstrate this, FIG. 6 shows an embodiment wherein the delay line 45 is implemented using an RC combination. The RC combination comprises a resistor 60 and capacitor 62.

The RC time-constant of this delay line is chosen to equal the time-constant $t_{esr}$, determined by the output capacitance and the equivalent series resistance of the output buffer capacitor of the buck converter, such that the voltage $V_{RC}$ on capacitor 62 will be a reproduction of the virtual voltage on the intrinsic output capacitor.

Figure 7:
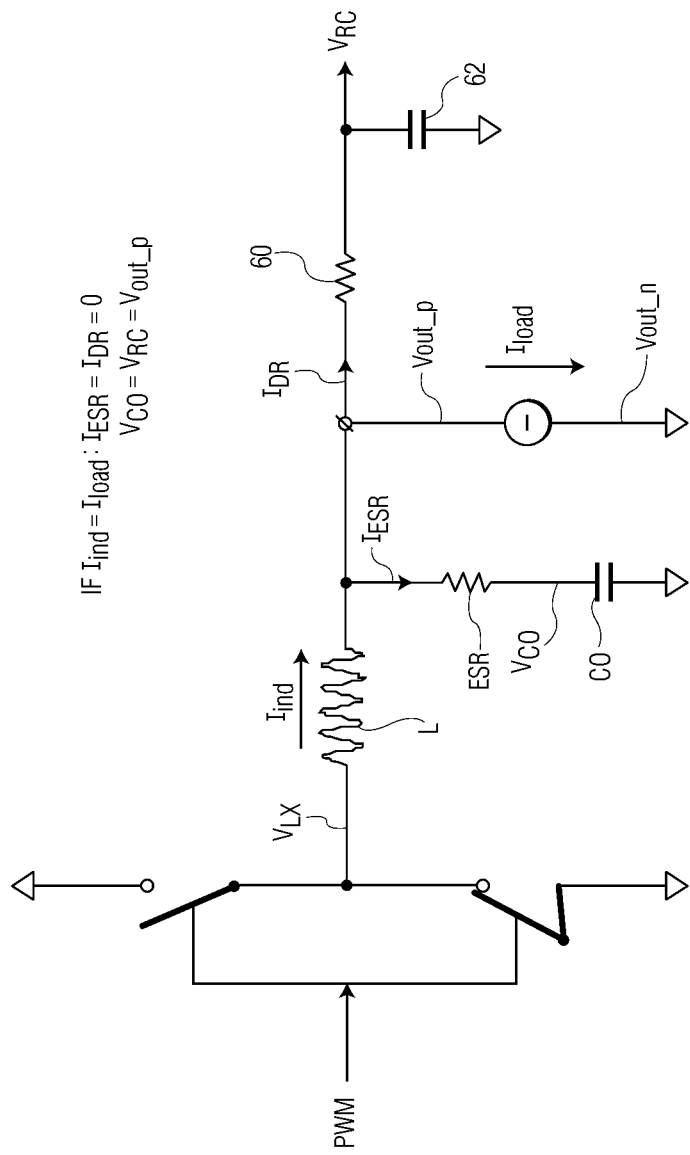
FIG. 7 is a simplified schematic of a buck convertor employing the embodiment of FIG. 6.

In this way, the 'real' peak or valley can now be determined by performing peak/valley detection on the real available voltage $V_{RC}$ on the capacitor 62. In this regard, it is recalled that the real peak or valley occurs when the current through the inductor is equal to the load current drawn from the output of the buck converter. Thus, precisely at the moment of the real peak or valley, the voltages $V_{out}$ and $V_{RC}$ are necessarily equal, since no current will be flowing through the ESR of the output capacitor 'CO' or through the resistor 60, as illustrated in FIG. 7.

Similarly, whenever the load current is larger than the inductor current, $V_{out}$ will be smaller than $V_{RC}$ and vice versa.

Thus, the practical implication of this phenomenon is the fact that a simple comparison of $V_{diff}$ and $V_{RC}$ is sufficient to determine the exact location of the real peak or valley.

Figure 8:
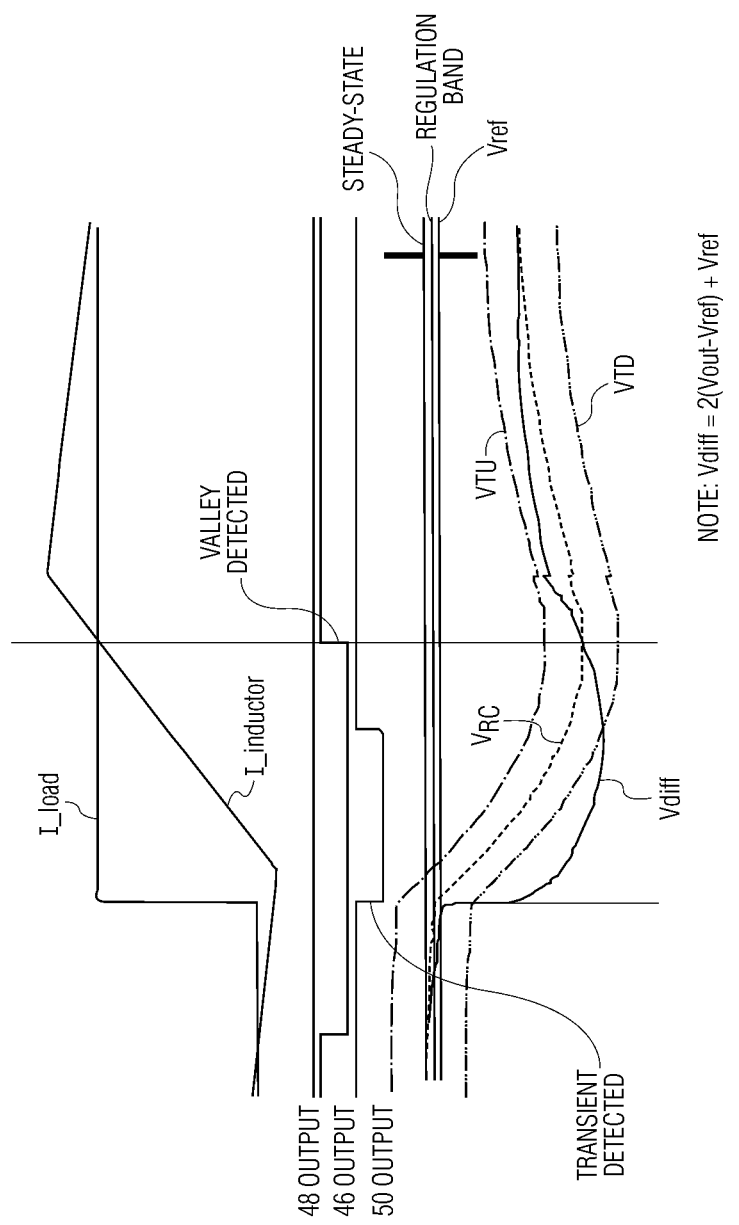
FIG. 8 shows the simulated behaviour of the combination of a controller, according to the embodiment of FIG. 6, and a buck converter having an inductor of 320 nH and an output capacitor of 400 µF with an ESR of 1 mΩ, responding to a 0-30 A load step.

Turning now to FIG. 8, shown is the simulated behaviour of the combination of a controller, according to the embodiment of FIG. 6, and a buck converter having an inductor of 320 nH and an output capacitor of 400 µF with an ESR of 1 mΩ, responding to a 0-30 A load step.

The transient detection window is +/−25 mV, but effectively +/−12.5 mV due to the gain of two in the differential amplifier. Resistor 60=4 kΩ, Capacitor 62=100 pF. The steady-state regulation window is +/−5 mV, so effectively +/−2.5 mV at $V_{ref}$=1.5V.

It can be clearly seen that $V_{diff}$ crosses $V_{RC}$ exactly at the point where the current through the inductor (I_inductor) equals the current through the load (I_load).

In addition to the simulation, an experimental prototype of the invention has been built using a field programmable gate array (FPGA) for all logic circuitry and a slightly modified existing printed circuit board (PCB) containing all analogue and mixed-signal circuitry including all components of the buck-converter.

Figure 9:
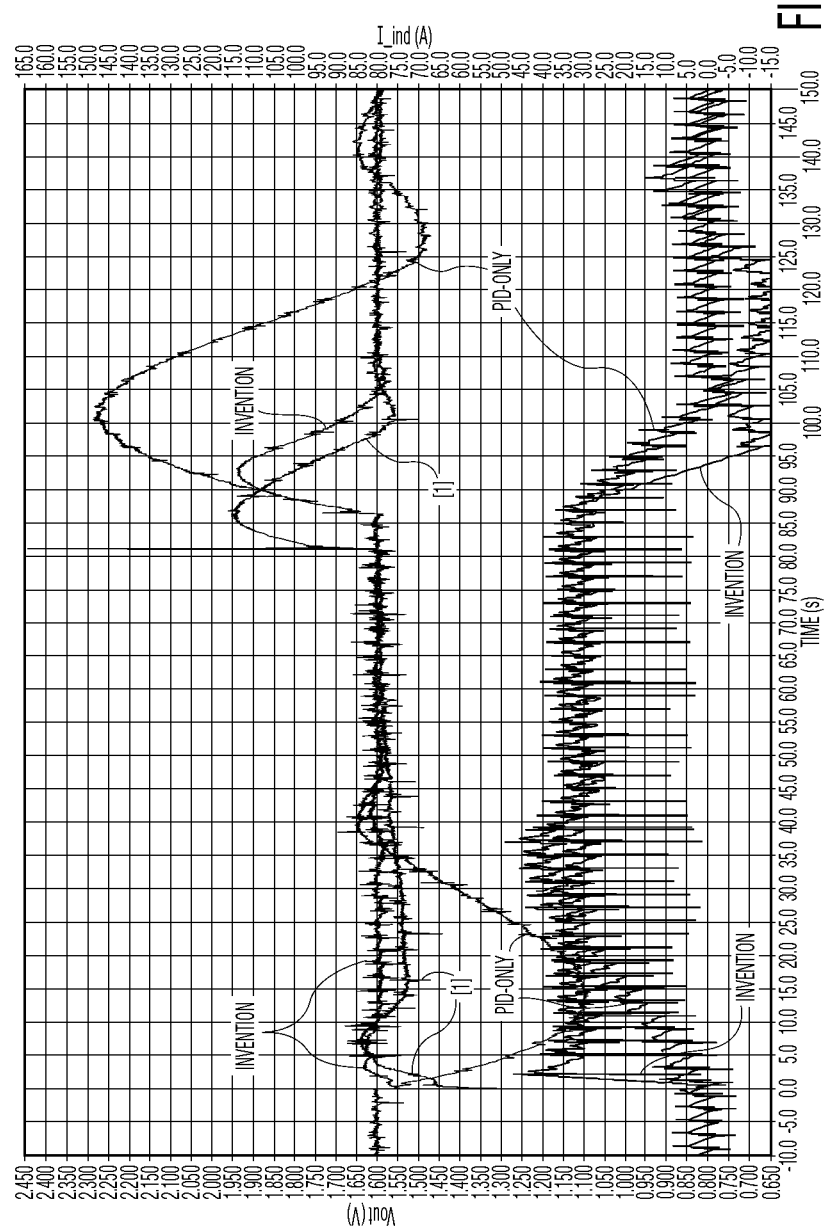
FIG. 9 illustrates the improvement in transient response for a 0-30-0 A load current step between a preferred embodiment of the invention, a PID compensator and a state-of-the-art controller for a DC-DC convertor.

FIG. 9 shows the improvement in transient response for a 0-30-0 A load current step between the preferred embodiment (labelled "Invention"), the PID compensator only (labelled "PID-only") and a state-of-the-art controller for a DC-DC convertor (labelled "[1]").

The scale for $V_{out}$ is 50 mV/div, for I_inductor it is 5 A/div and the time base is 5 µs/div.

The PID compensator with only six comparators is not optimised for speed, because that would yield a poor steady-state regulation. The response of the state-of-the-art controller for a DC-DC convertor is actually measured using existing silicon of the TEA1321 and the load step duration is made somewhat shorter to prevent too much overlap with the response of the preferred embodiment of the invention.

As can be seen, the main improvement of the present invention with respect to a state-of-the-art approach is about three times smaller undershoot and faster recovery to within the regulation band.

A preferred embodiment of the present invention may be equipped with a dual set of PID settings, one slow set used during steady-state (when Vout is within regulation band), the other, fast set, when not in steady-state and not in transient mode, thus enabling faster recovery and almost flat current response.

For an even better synchronisation of the handing back of the control to the PID controller after a transient recovery the second peak or valley (I_inductor=I_load) may be used, as at that moment both voltage and current are close to the new steady-state, which guarantee a smoother transition to PID mode because of the smaller error.

The invention can be used in loop regulators for Point of Load applications, or in any other application where a need exists for (fast) transient detection and/or (accurate) peak-/valley-detection.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A circuit for a switch mode power supply comprising: a transient detection portion comprising a resistor capacitor combination configured to delay an analogue error signal, the analogue error signal being derived from an output voltage of the switch mode power supply and a reference voltage and to detect whether a difference between the analogue error signal and the delayed analogue error signal is within a predetermined range, wherein the transient detection portion is further configured to determine if the delayed analogue error signal is smaller or larger than the analogue error signal, wherein the resistor capacitor combination includes a capacitor and a first resistor, wherein the transient detection portion further includes a second resistor and a third resistor, wherein the capacitor and the first resistor are directly connected to the second resistor and the third resistor, wherein the transient detection portion is further configured to generate the analogue error signal based on a difference between the output voltage of the switch mode power supply and a predetermined reference voltage, wherein the transient detection portion comprises: first and second comparators having their reference inputs connected to the second resistor and a node that is directly connected to the capacitor and the first, second and third resistors, respectively, and a third comparator having a reference input connected to the third resistor, wherein the first, second and third comparators are configured to receive first, second and third reference voltage levels determined with respect to the delayed analogue error signal, respectively, and wherein each of their second inputs is configured to directly receive the analogue error signal.

2. The circuit of claim 1, wherein the resistor capacitor combination is configured to have a same resistance capacitance product as a resistor capacitor combination formed by a capacitance and equivalent series resistance of an output capacitor of the switch mode power supply.

3. The circuit of claim 1, wherein the transient detection portion is further configured to determine if a current through an inductor of the switch mode power supply is substantially equal to a load current drawn from the switch mode power supply output.

4. A switch mode power supply comprising a circuit according to claim 1.

5. A method for regulating an output voltage of a switch mode power supply comprising the steps of: deriving an analogue error signal from the output voltage of the switch mode power supply; delaying the analogue error signal using a transient detection portion having a resistor capacitor combination; detecting whether a difference between the output voltage and the delayed analogue error signal is within a predetermined range, and determining if the delayed analogue error signal is smaller or larger than the analogue error signal, wherein the resistor capacitor combination includes a capacitor and a first resistor, wherein the transient detection portion further includes a second resistor and a third resistor, wherein the capacitor and the first resistor are directly connected to the second resistor and the third resistor, wherein the transient detection portion comprises: first and second comparators having their first inputs connected to the second resistor and a node that is connected to the capacitor and the first, second and third resistors, respectively, and a third comparator having a reference input connected to the third resistor, wherein the first, second and third comparators receive first, second and third reference voltage levels determined with respect to the delayed analogue error signal, respectively, and wherein each of their second inputs directly receives the analogue error signal.

6. The method of claim 5, further comprising the step of determining if a current through an inductor of the switch mode power supply is substantially equal to a load current drawn from the switch mode power supply output.

7. The circuit of claim 1, wherein each of the first, second and third comparators is configured to compare a respective one of the first, second and third reference voltage levels with the analogue error signal.

* * * * *